Oct. 28, 1941.   R. D. CLEMSON   2,260,801
MOWER
Filed Feb. 14, 1939   3 Sheets-Sheet 3

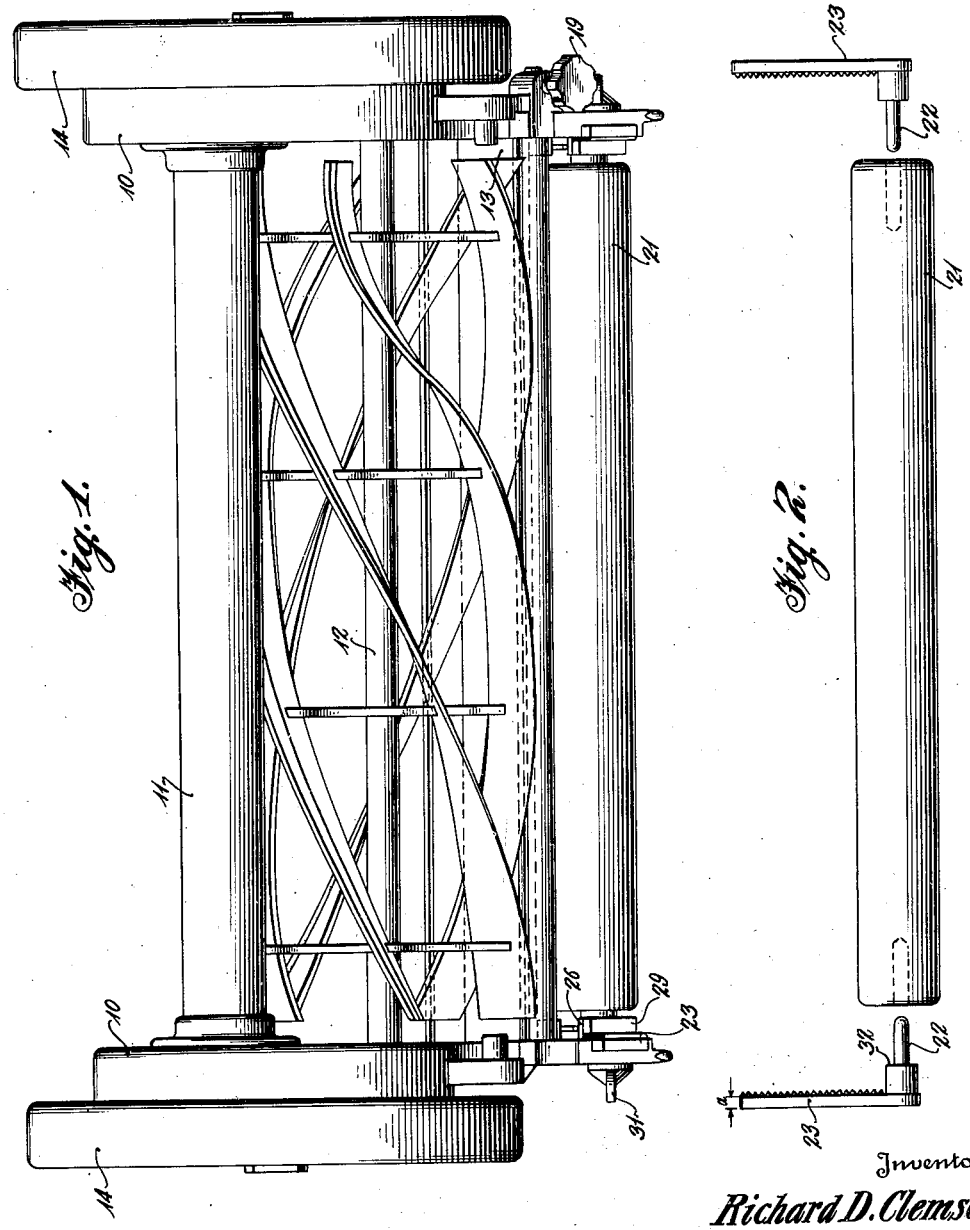

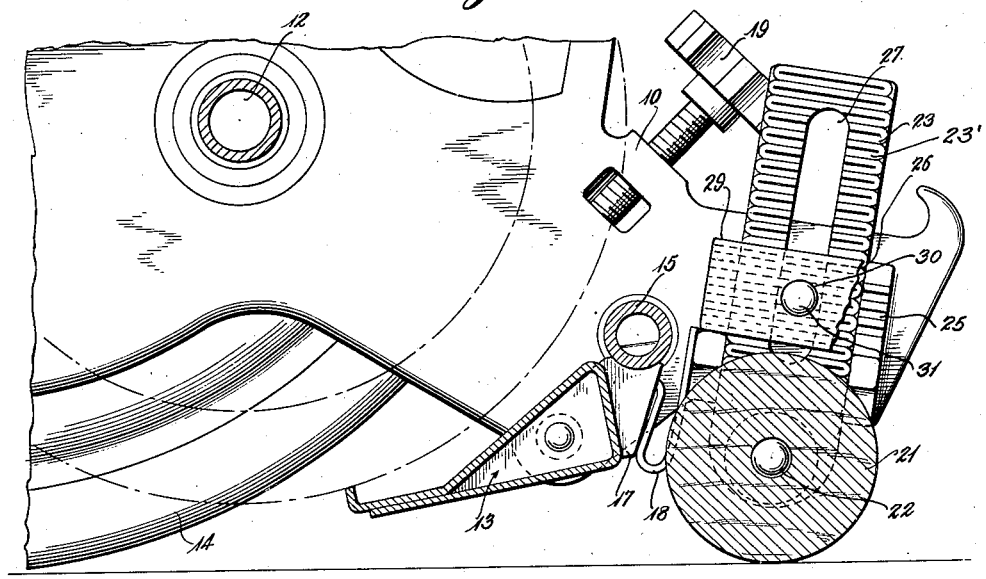
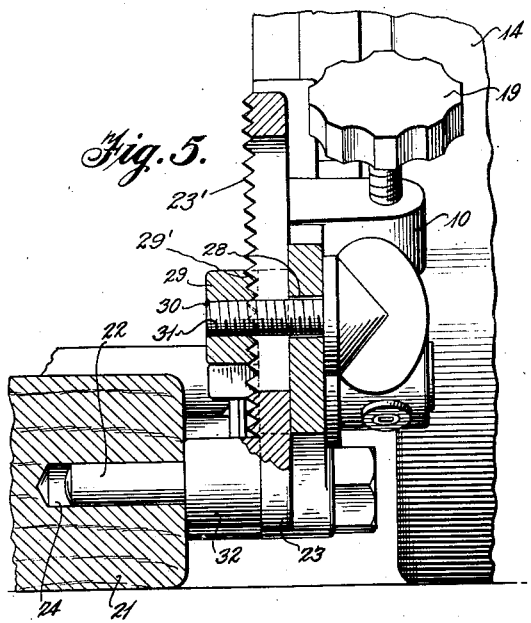
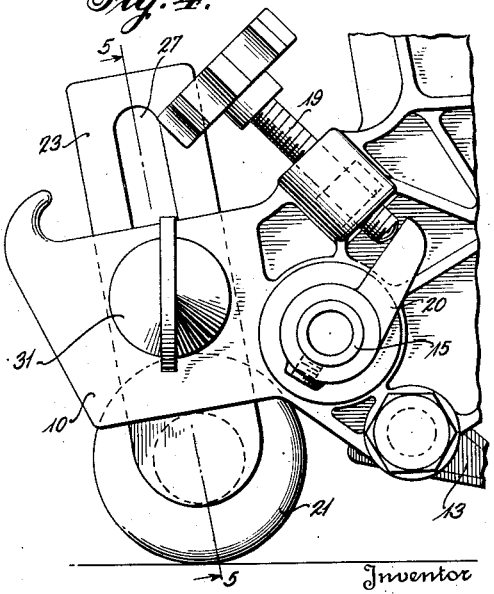

Inventor.
Richard D. Clemson

Patented Oct. 28, 1941

2,260,801

UNITED STATES PATENT OFFICE 2,260,801

MOWER

Richard D. Clemson, Middletown, N. Y., assignor to Clemson Bros., Inc., Middletown, N. Y., a corporation of New York Application February 14, 1939, Serial No. 256,380

2 Claims. (Cl. 56—249)

This invention relates to an adjustable mounting for the ground roller of a lawn mower.

It is common practice to provide a lawn mower of the rotary cutting reel and bed knife type with a ground roller to the rear of the cutting mechanism in order to control the height of the cut made by the machine. The cutting edges are generally located well to the rear of the wheels and by alteration of the vertical position of the ground roller with respect to the frame, the knives are raised or lowered with respect to the ground, resulting in a difference in the length of the grass or weeds left by the cutting. In effect, the whole mower structure is supported on the ground by the wheels at each side and the ground roller.

The wheels are usually of sturdy construction and mounted on rugged bearings in the frame. Since the position of the bearings with respect to the frame is maintained constant, the points of attachment of the wheels may be rigidly positioned and capable of withstanding the normal shocks incident to operation over rough ground. It has been common practice to attach the ground roller to the mower frame by a supporting plate secured to each side of the frame and having a lug fitted into a hole in the corresponding end of the ground roller. Adjustability of the ground roller is accomplished by a bolt passed through a hole in the side frame member and through a vertical slot in the supporting plate having a washer and nut bearing against the said plate. The weight of the mower bearing on the ground roller and the shocks applied to the said roller during operation tend to displace the predetermined fixed position of the supporting plate and it has been customary to provide the contacting surfaces of the side frame member and the supporting plate with matching teeth whereby the supporting plate is maintained in the desired position so long as the nut is retained in tight engagement with the surface thereof. In such construction the supporting plate is, in effect, an adjustable extension of the side frame member. This construction is clearly shown in United States Patent No. 475,669 to Coldwell et al.

In practical operation the shocks applied to the ground roller are communicated through the supporting plate to the nut. This latter part is able to rotate upon the bolt and the above noted shocks normally tend to cause such rotation, thereby rendering the nut and bolt connection loose and eventually impairing the adjustment of the ground roller unless the nut is frequently tightened on the bolt.

I have now devised an adjustable mounting for the ground roller of a lawn mower which makes possible positive positioning of the said roller in a manner that is not subject to loosening or displacement by shock. It is an object of this invention to provide such a mounting in which the supporting plate carrying a lug for insertion in the end of the ground roller is engaged by means on the frame which are not subject to progressive loosening or displacement.

A further object hereof is the provision of a ground roller mounting in which the tightening element serves no function other than that of maintaining the holding members in proper operative relationship as compared with the practice in the prior art of using the bolt to secure the supporting plate to the frame.

In its preferred embodiment the invention contemplates a retaining plate serrated on one face thereof and secured against a serrated surface on the frame member together with a supporting plate lying in a channel in the said serrated surface and having one face thereof serrated to mesh with the said serrated face of the retaining plate. By this means the supporting plate is adjustably positioned by the sides of the channel and the retaining plate which parts are, in effect, elements of the frame and no torque strains are applied to the means securing the retaining plate to the frame proper.

The invention will be more clearly understood from the following detailed description of a preferred embodiment thereof when considered in connection with the attached drawings wherein:

Figure 1 represents an assembled lawn mower embodying the principles of this invention;

Figure 2 is an exploded view of the ground roller and supporting plates;

Figure 3 is a partial section through the ground roller and bed knife of the machine illustrated in Figure 1;

Figure 4 is a partial end elevation of the lawn mower of Figure 1;

Figure 5 is a partial section on line 5—5 of Figure 4;

Figure 6:
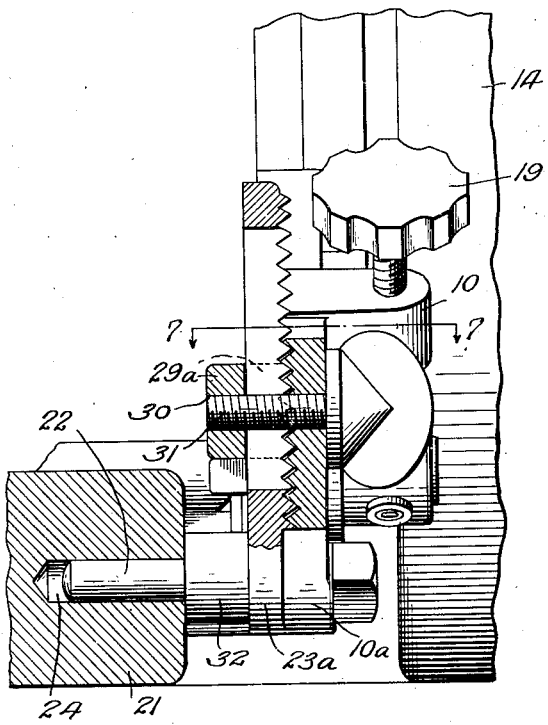
Figure 6 is a fragmentary view of the rear end of a mower, partly in section, showing a modified embodiment of my invention.

With particular reference to Figure 1, the complete lawn mower comprises end frame members 10 connected by a tie tube 11, a rotary cutting reel 12, and a bed knife 13. A wheel 14 mounted on each end of the machine is operatively connected to reel 12 by a suitable transmission (not shown) as a gear train or chain and sprocket arrangement within the frame member 10. Suitable means are provided to adjust the position of the edge of bed knife 13 with respect to the spiral fly knives of the reel 12. In the present instance the adjusting means comprises a cam rod 15 and followers 17 on the bed knife proper together with springs 18. A manually operated screw 19 acts on a finger 20 affixed to the end of rod 15 to rotate the latter.

The ground roller 21 is carried on lugs 22 of the supporting plate 23 fitting in openings 24 at the ends of the roller 21. As will be clearly seen from Fig. 3, the position of the cutting edge of bed knife 13 with respect to the surface over which the machine is propelled is positively controlled by the position of ground roller 21 with respect to the frame 10. The means by which the latter position is maintained form the principal aspects of this invention.

The inwardly directed surface of each frame member 10 is formed with a serrated surface 25 having a series of parallel teeth intersected by a channel 26 of a width sufficient to allow supporting plate 23 to move freely therein and of a depth approximately equal to the thickness of plate 23 from the flat side thereof to the base of the teeth on the other side, that is, the distance $a$ indicated on Figure 2. A slot 27 is formed in the supporting plate 23 and a hole 28 is bored through side frame member 10 to register with the said slot.

A retaining plate 29 is formed with a serrated surface 29' adapted to mesh with the teeth on the surface 25 of the frame member 10 and the teeth 23' formed on supporting plate 23. The retaining plate is tapped and threaded at 30 to receive a bolt 31 passed through the hole 28 in member 10 and the slot 27 in supporting plate 23. Preferably, a shoulder 32 is formed on supporting plate 23 to maintain the end of ground roller 21 a sufficient distance from the side frame member 10 to prevent interference between the said roller and other operative parts of the machine.

In its preferred embodiment, the invention contemplates that the various serrated surfaces shall be so proportioned that the supporting plate 23 is somewhat loosely maintained in channel 26 by retaining plate 29. The amount of play provided thereby need not be great and is preferably slight but should be sufficient to positively insure that when the parts are placed in close engagement by tightening bolt 31, the teeth 29' of retaining plate 29 will be forced into rigidly interfitting contact with the teeth of serrated surface 25 but will interlock with the teeth 23' of supporting plate 23 rather loosely.

When a mowing machine constructed in accordance with the principles of this invention is propelled over rough ground, the shocks normally incident to such operation will tend to impart torque stresses to the supporting plate which are communicated to the retaining plate 29. Since the position of the meshing teeth on surface 25 and retaining plate 29 are such as to positively inhibit relative motion thereof, there will be no rotation imparted through plate 29 to bolt 31 and therefore no tendency to loosen the threaded engagement thereof.

It will be seen from the above discussion that relative motion between retaining plate 29 and frame member 10 should be positively inhibited in order that there shall be no loosening of the bolt 31. It is also apparent that relative motion between frame member 10 or retaining plate 29 and supporting plate 23 must be limited but need not be inhibited. In fact, it is preferable, as in the construction shown here, that the said relative motion shall not be inhibited, in order that the retaining plate 29 shall enter into close engagement with surface 25 before it bears tightly against the serrated face of supporting plate 23 in order that the presence of supporting plate 23 in the channel 26 will not impair the engagement between plate 29 and surface 25.

The structure shown here as a preferred embodiment is not to be regarded as limiting or exhaustive of the invention, but is presented as illustrative of the principles thereof. Modifications of the present structure in various ways to accomplish substantially the same result will be readily made by those skilled in the art in the light of the above description.

Figure 7:
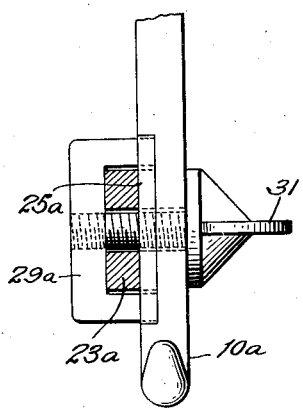
Figure 7 is a sectional view taken along the line 7—7 of Figure 6.

For example, as shown in Figs. 6 and 7 the serrated face of supporting plate 23a may be directed toward and the teeth thereof mesh with a suitably formed surface 25a on frame member 10a. Similarly, the channel may be formed in retaining plate 29a. It will be readily understood that, wherever the channel is positioned, the teeth matching those on supporting plate 23 may be either in the channel or on the face of the member not having a channel. Intermediate modifications involving a part of the channel on each of members 10 and 29 and/or teeth on each of the said members can be adequately designed to the purposes of this invention.

Further, I do not intend to limit this invention to teeth of the form shown. Any system of matching projections and depressions may be employed with good results, so long as the basic concepts of the invention are followed.

In its broadest aspect, the invention consists in a mounting or supporting member for the ground roller which is provided with projections, recesses or other means for making engagement interchangeably with cooperating means on the frame to secure the supporting member at any of a number of heights relative to the frame, a simple rotary clamping device for clamping the cooperating means in engagement in which the parts in which the clamping device bears are not subjected to rotary torque co-axial with the clamping rotation and especially where such clamping member bears only upon parts which are locked together and which engage the supporting member in such a way or with such clearance that torque stresses are not transmitted thereto so as to produce elastic or clearance movements in the rotary direction which would affect the clamping. Except for the advantage of simpler manufacturing there is some advantage in making the selective limiting projections on the frame at the back of the channel instead of on the retaining member as shown. This avoids any tendency to twist the retaining member, but if the engagement between the retaining member and the frame is sufficiently tight and accurate to inhibit such twisting the arrangement shown is entirely satisfactory.

What I claim is:

1. An adjustable mounting for the ground roller of a lawn mower of the type having a frame on which the operative mechanism thereof is mounted comprising at each end of said frame a channel in said frame, a supporting member fitted in said channel for rotatably mounting said ground roller, a retaining member overlying said channel to retain said supporting member therein but having substantial clearance with said supporting member, a bolt passing through said frame and engaging threads in said retaining member relative to said frame, projections on opposing faces of said frame and said retaining member respectively, rigidly interfitted to inhibit movement of said retaining member relative to said frame, and projections on opposing faces of said retaining member and said supporting member respectively to limit movement of said supporting member relative to said frame.

2. An adjustable mounting for the ground roller of a lawn mower of the type having a frame on which the operative mechanism thereof is mounted comprising at each end of the said frame a channel in said frame, a series of elongated teeth on each side of said channel substantially normal thereto, a supporting member for rotatably mounting said ground roller lying in said channel having a longitudinal slot therein and a series of elongated teeth normal to said slot, the teeth of said supporting member having their faces corresponding to but below the faces of the teeth on said frame, a retaining member overlying said channel and said supporting member having a series of elongated teeth engaging the said teeth on said frame and said supporting member, and a thumb screw passing through said frame and said slot and engaging threads in said retaining member.

RICHARD D. CLEMSON.